(12) United States Patent
Horner

(10) Patent No.: US 11,262,440 B2
(45) Date of Patent: Mar. 1, 2022

(54) FORMING A COMPOSITE DOWN SONAR IMAGE

(71) Applicant: Navico Holding AS, Egersund (NO)

(72) Inventor: Ronald Horner, Collinsville, OK (US)

(73) Assignee: NAVICO HOLDING AS, Egersund (NO)

( * ) Notice: Subject to any disclaimer, the term of this patent is extended or adjusted under 35 U.S.C. 154(b) by 743 days.

(21) Appl. No.: 16/204,517

(22) Filed: Nov. 29, 2018

(65) Prior Publication Data

US 2020/0041632 A1 Feb. 6, 2020

Related U.S. Application Data

(63) Continuation of application No. 16/051,983, filed on Aug. 1, 2018.

(51) Int. Cl.
*G01S 7/58* (2006.01)
*G01S 15/89* (2006.01)

(52) U.S. Cl.
CPC ............ *G01S 7/58* (2013.01); *G01S 15/8902* (2013.01)

(58) Field of Classification Search
None
See application file for complete search history.

(56) References Cited

U.S. PATENT DOCUMENTS

| | | |
|---|---|---|
| 8,300,499 B2 | 10/2012 | Coleman et al. |
| 9,739,884 B2 | 8/2017 | Proctor et al. |
| 9,784,832 B2 | 10/2017 | Proctor et al. |
| 10,018,719 B2 | 7/2018 | Proctor et al. |
| 2013/0148471 A1 | 6/2013 | Brown et al. |
| 2016/0259050 A1 | 9/2016 | Proctor et al. |
| 2016/0259051 A1 | 9/2016 | Proctor et al. |
| 2016/0306040 A1 | 10/2016 | Hunt et al. |
| 2017/0219703 A1 | 8/2017 | Proctor et al. |
| 2017/0285167 A1 | 10/2017 | Proctor et al. |
| 2017/0371039 A1 | 12/2017 | Clark et al. |
| 2020/0041631 A1 | 2/2020 | Horner |

OTHER PUBLICATIONS

Green; Mantime Archaeology: A Technical Handbook, ISBN 0-12-298632-6, 2004, pp. 1-470 (Year: 2004).

*Primary Examiner* — Hovhannes Baghdasaryan
(74) *Attorney, Agent, or Firm* — Nelson Mullins Riley & Scarborough LLP

(57) ABSTRACT

An apparatus configured to generate a first sonar image from first sonar returns corresponding to a first depth range and generate a second sonar image from the first sonar returns and second sonar returns, the second sonar returns corresponding to a second depth range greater than the first depth range of the first sonar returns such that a portion of the second sonar image does not include sonar return data. The portion without sonar return data corresponds to a period of the first sonar returns and depths greater than the maximum depth of the first depth range. The apparatus is configured to generate and display a fill image for the portion of the second sonar image based on at least one set of side facing sonar return data corresponding to the time period associated with the first sonar returns.

20 Claims, 12 Drawing Sheets

FORMING A COMPOSITE DOWN SONAR IMAGE

CROSS REFERENCE TO RELATED APPLICATIONS

This application claims priority to and is a continuation of U.S. patent application Ser. No. 16/051,983, entitled "Marine Electronic Device for Presentment of Sonar Images," filed Aug. 1, 2018, which is incorporated by reference herein in its entirety.

FIELD OF THE INVENTION

Embodiments of the present invention relate generally to generating sonar images, and more particularly, to systems and apparatuses for providing improved down sonar images.

BACKGROUND OF THE INVENTION

A marine electronic device may be configured to receive marine data from one or more data sources including from sonar transducers. Sonar data may be used to detect features of and/or objects in an underwater environment. In particular, when analyzed, sonar return data may be used to determine depths of a marine environment, detect fish or other waterborne objects, locate wreckage, and/or the like. An operator of a watercraft may use sonar image data, based on the sonar return data, to assist with the navigation of the watercraft and/or to perform other functions. The sonar images utilize sonar data received from one or more transducers on a vessel to provide a "picture" of the underwater environment.

BRIEF SUMMARY OF THE INVENTION

A display panel can be used to present marine information (such as sonar images) to a user. For example, a display may present a down sonar image, side sonar image(s), forward sonar images, or the like. In some cases, the sonar images may be generated based on a buildup of a plurality of sonar returns, or sonar slices. For presentment on a marine electronic device (e.g., a multi-functional display or MFD), down facing sonar data may be clipped (or cropped) at a predetermined depth, such as beyond bottom depth. For example, if the determined bottom depth is approximately fifteen feet, the marine electronic device may clip the sonar image and associated sonar data at twenty-five feet. As the vessel travels about the body of water, the bottom depth may increase necessitating an increase in the depth displayed on the marine electronic device. For example, the depth may increase to twenty feet and the sonar image may increase the displayed depth to thirty-five feet, or the bottom depth may increase to thirty feet and the sonar image displayed depth may increase to forty-five feet.

The change in depth scale of the image may result in portions of the sonar image being displayed without associated sonar data, e.g. the portions of the sonar image that were associated with a shallower depth. These portions of the sonar image may be rendered as blank areas, which may detract from the user experience, or give an impression of a malfunction.

In an example embodiment, the marine electronic device may generate a fill image for blank or unrendered portions of the sonar image. The marine electronic device may generate the fill image based on side facing sonar data corresponding to the time period associated with the down facing sonar data that has been clipped. The sonar image may thereby be displayed on the marine electronic device with the fill image in place of the blank portion, resulting in a display of an aesthetically pleasing complete sonar image. Further, in such example embodiments, the processing power saved by only initially rendering sonar data for the depth scale of the first portion of sonar returns is still saved, while still providing for a more aesthetically pleasing image once the depth scale increases.

The marine electronic device may be configured to determine the depth change when the sonar return data is received, such that the fill image may be generated with the generation of the sonar image. This may reduce or prevent lag in display of the complete sonar image. The marine electronic device may be configured to generate the fill image by generating a composite image of a first and second side facing sonar return data. The composite image may include the maximum intensity values, minimum intensity values, or a weighted intensity value for the first and second side facing sonar return data.

In some instances, a seam may form between the sonar image and the fill image. The marine electronic device may be configured to blend the sonar image and the fill image around the seam to generate a more aesthetically pleasing complete image. For example, the marine electronic device may weight and sum pixel values within a predetermined number of pixels of the seam. Additionally or alternatively, the marine electronic device may generate a composite image within a predetermined distance from the seam based on the side facing sonar return data and the down facing sonar return data.

In an example embodiment, the marine electronic device may be configured to generate a composite down facing sonar image based on the side facing sonar return data. The generation of the composite down facing image based on the side facing sonar returns may also be beneficial in an instance in which down facing sonar return data is unavailable, such as due to a loss of data connection or a failure of a down facing sonar transducer.

In an example embodiment, an apparatus for providing marine information is provided. The apparatus includes a user interface, a processor, and a memory including computer program code. The memory and the computer program code configured to, with the processor, cause the apparatus to receive first sonar returns from a down facing transducer received from an underwater environment relative to a vessel. The first sonar returns correspond to a first depth range. The memory and the computer program code are further configured to generate, based on the first sonar returns, a first sonar image built up of first sonar return data from the first sonar returns. The first sonar image defines a first depth range corresponding to the first depth range of the first sonar returns. The memory and the computer program code are further configured to receive second sonar returns from the down facing transducer. The second sonar returns correspond to a second depth range and a maximum depth of the second depth range of the second sonar returns is greater than a maximum depth of the first depth range of the first sonar returns. The memory and the computer program code are further configured to generate, based on the second sonar returns, a second sonar image built up of the first sonar return data from the first sonar returns and second sonar return data from the second sonar returns. The second sonar image defines a second depth range corresponding to the second depth range of the second sonar returns such that a portion of the second sonar image does not include sonar return data. The portion of the second sonar image that does not include sonar return data corresponds to a time period associated with the first sonar returns and one or more depths greater than the maximum depth of the first depth range of the first sonar returns. The memory and the computer program code are further configured to generate a fill image for the portion of the second sonar image based on at least one set of side facing sonar return data corresponding to the time period associated with the first sonar returns and the one or more depths greater than the maximum depth of the first depth range of the first sonar returns and cause the second sonar image to be displayed on the user interface with the fill image in place of the portion.

In some example embodiments, the memory and computer program code are further configured to determine a change of a depth range when receiving the second sonar returns. The fill image is generated in response to the determination of the change in depth range.

In an example embodiment, generating the fill image comprises generating a composite of maximum intensity values of first side facing sonar return data and second side facing sonar return data.

In some example embodiments, generating the fill image comprises generating a composite of minimum intensity values of first side facing sonar return data and second side facing sonar return data.

In an example embodiment, generating the fill image comprises generating a composite of weighted intensity values of first side facing sonar return data and second side facing sonar return data. In some example embodiments, the memory and computer program code are further configured to identify a seam between the fill image and the sonar image.

In some example embodiments, the memory and computer program code are further configured to blend a seam between the fill image and the second sonar image by weighting pixel values within a predetermined number of pixels from the seam.

In an example embodiment, the memory and computer program code are further configured to blend a seam between the fill image and the second sonar image by generating a composite image within a predetermined distance from the seam. The composite image is based on the first sonar returns and at least one of a first side facing sonar return and a second side facing sonar return.

In another example embodiment, an apparatus for providing marine information is provided. The apparatus includes a user interface, a processor, and a memory including computer program code, the memory and the computer program code configured to, with the processor, cause the apparatus to receive first side facing sonar returns from an underwater environment relative to a first side of a vessel, receive second side facing sonar returns from the underwater environment relative to a second side of the vessel. The second side of the vessel is opposite the first side of the vessel. The memory and the computer program code are further configured to generate a composite down sonar image based on both the first side facing sonar returns and the second side facing returns, and cause the composite down image to be displayed on the user interface.

Additional example embodiments of the present invention include methods, systems, and computer program products associated with various embodiments described herein, including, for example, the above described apparatus embodiments.

BRIEF DESCRIPTION OF THE DRAWINGS

Figure 1:
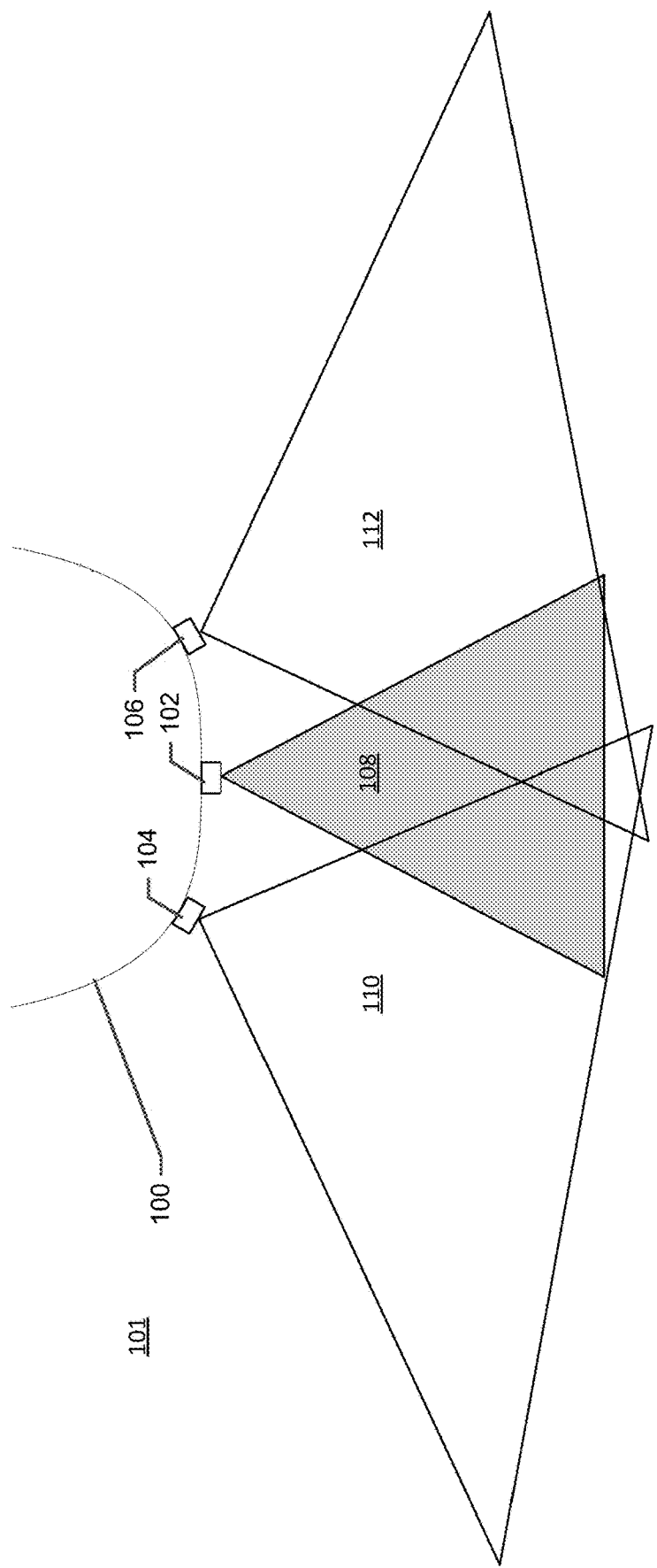
Figure 2:
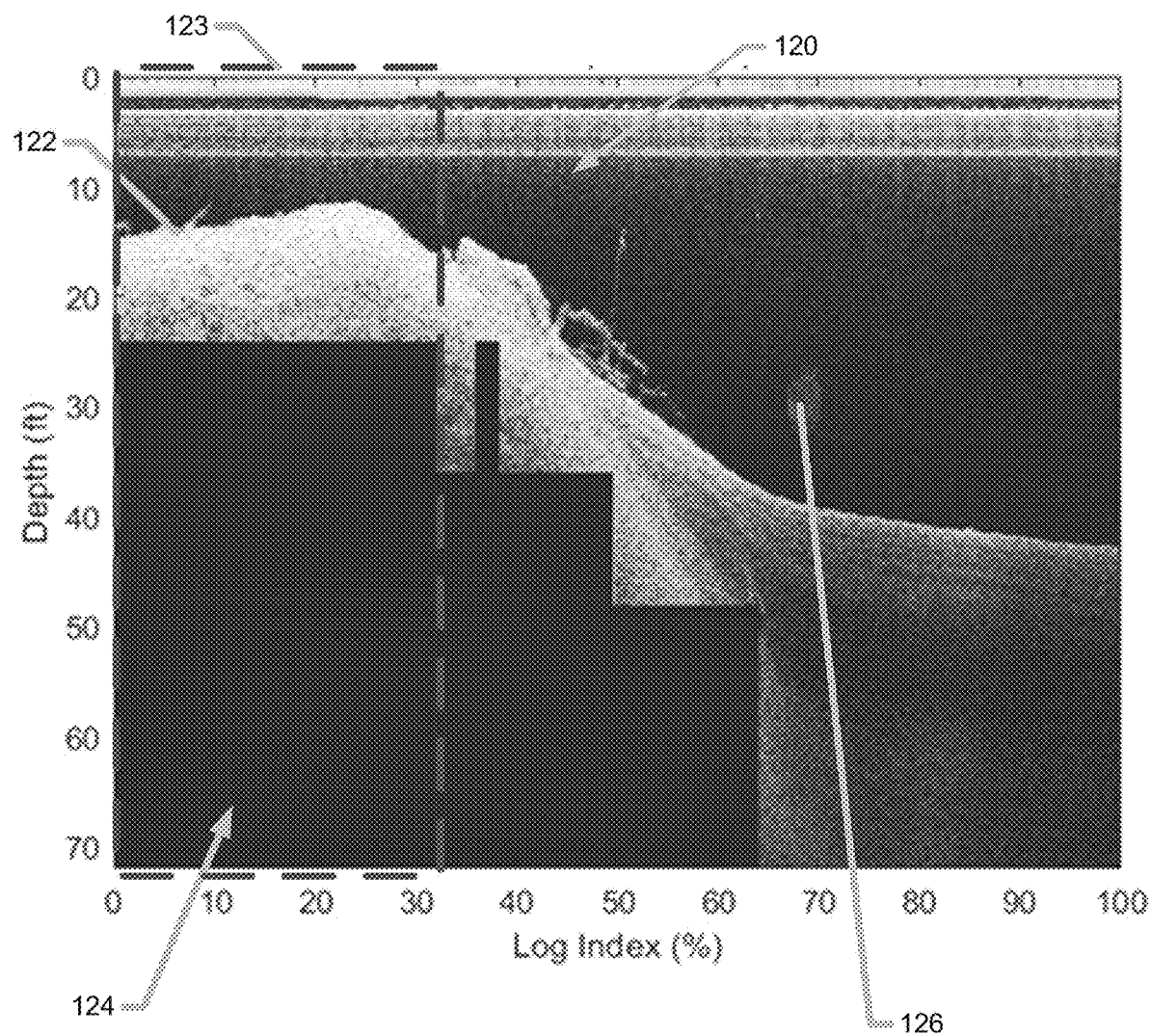
Figure 3A:
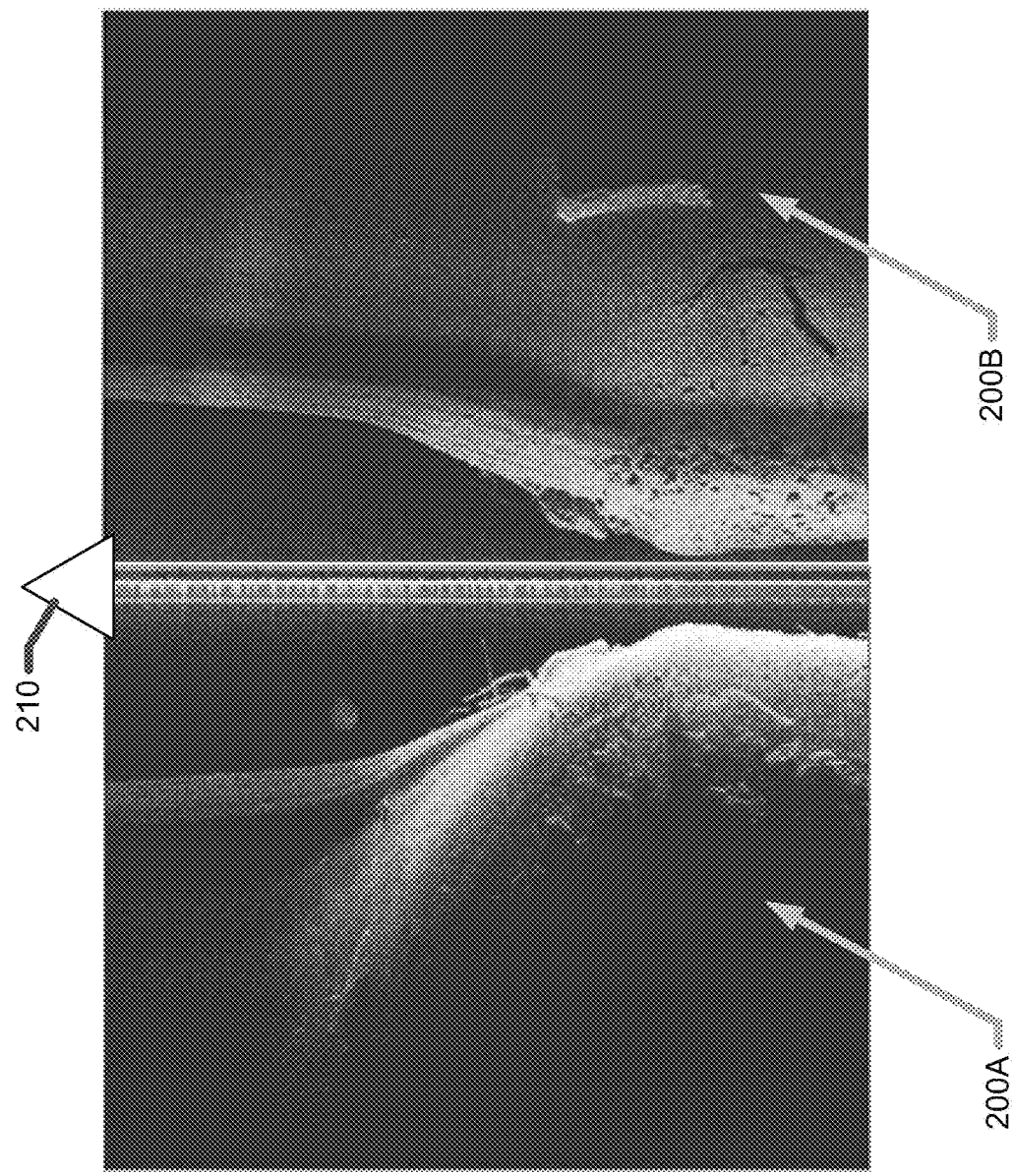
Figure 3B:
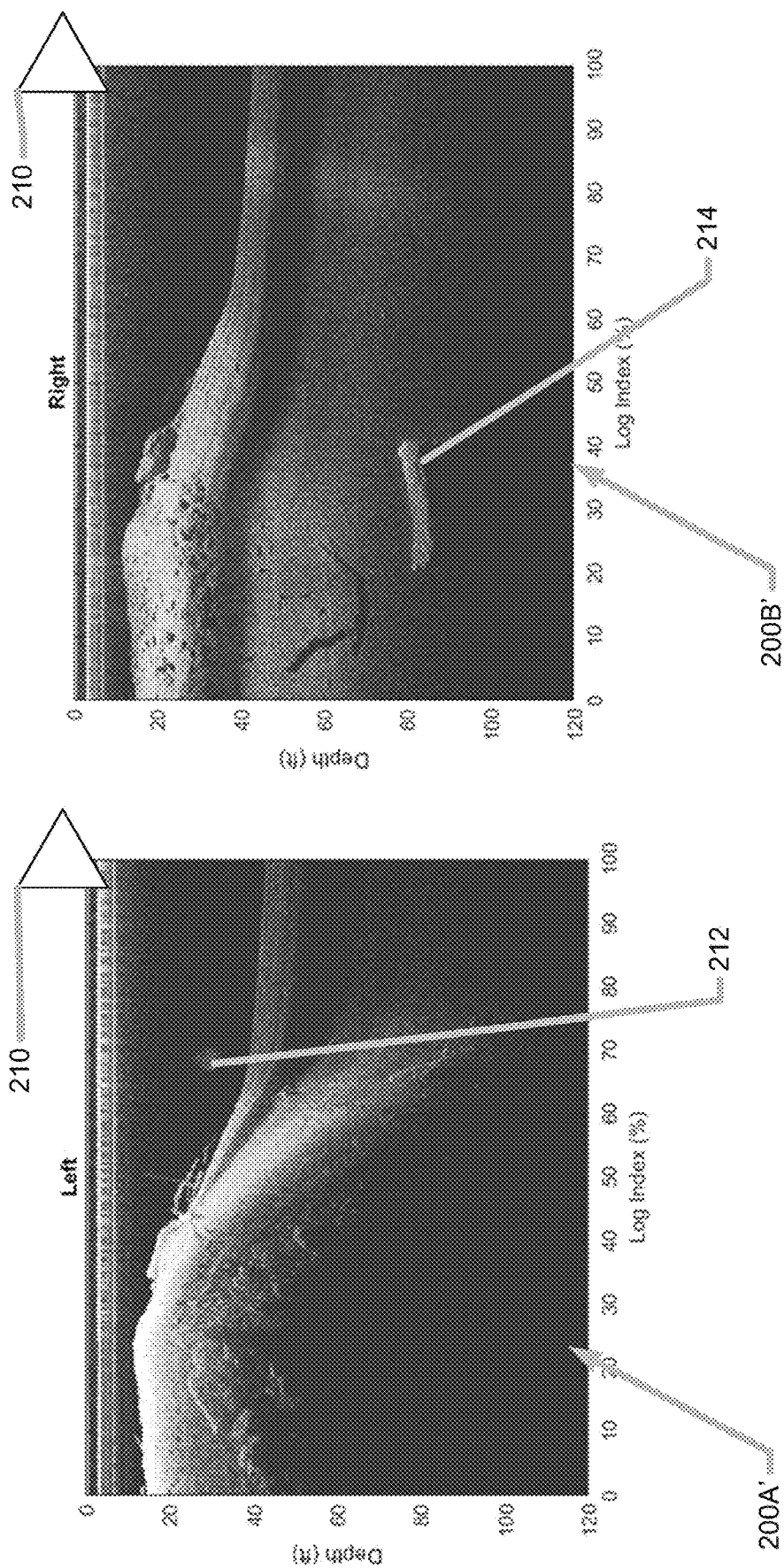
Figure 4:
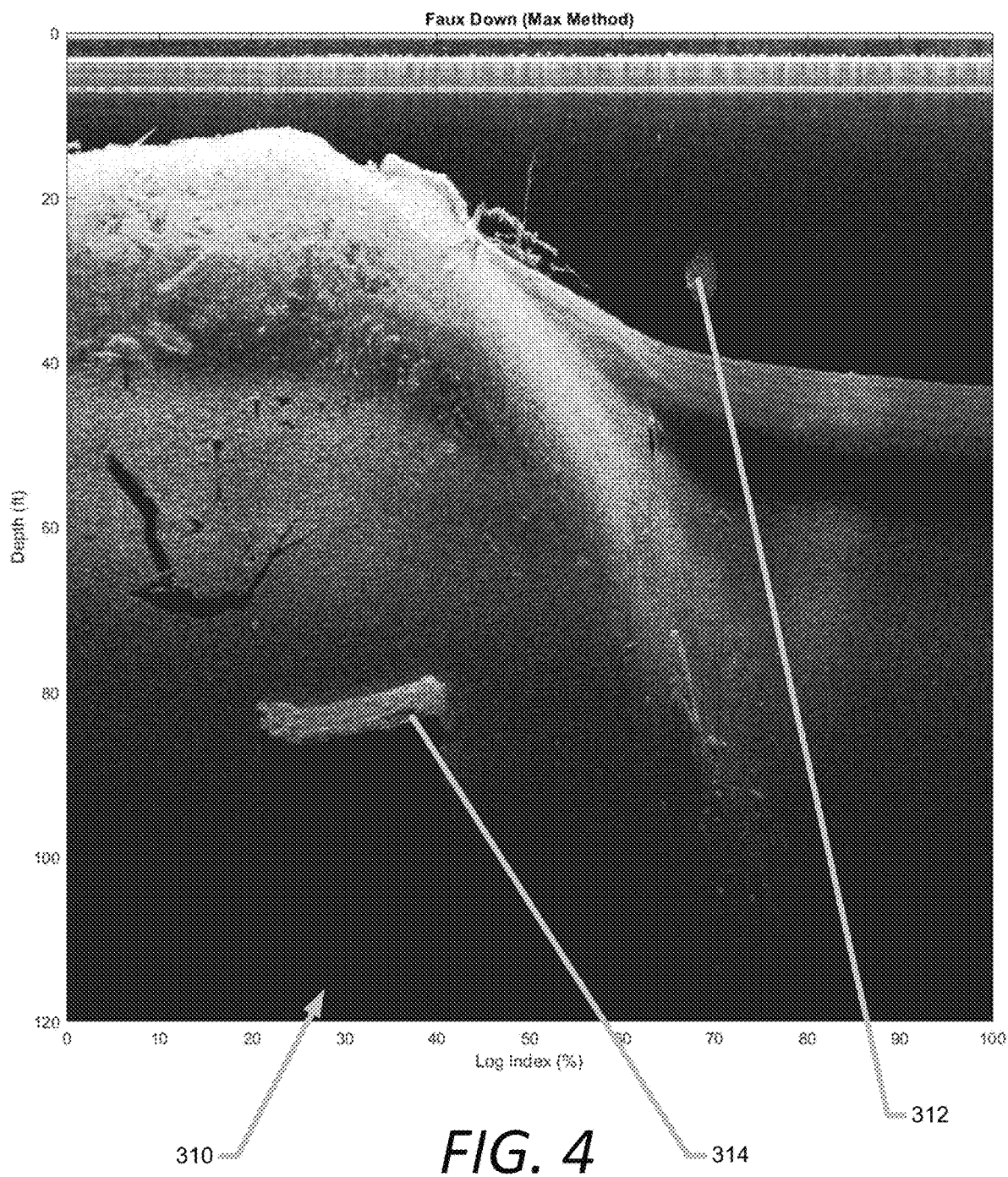
Figure 9:
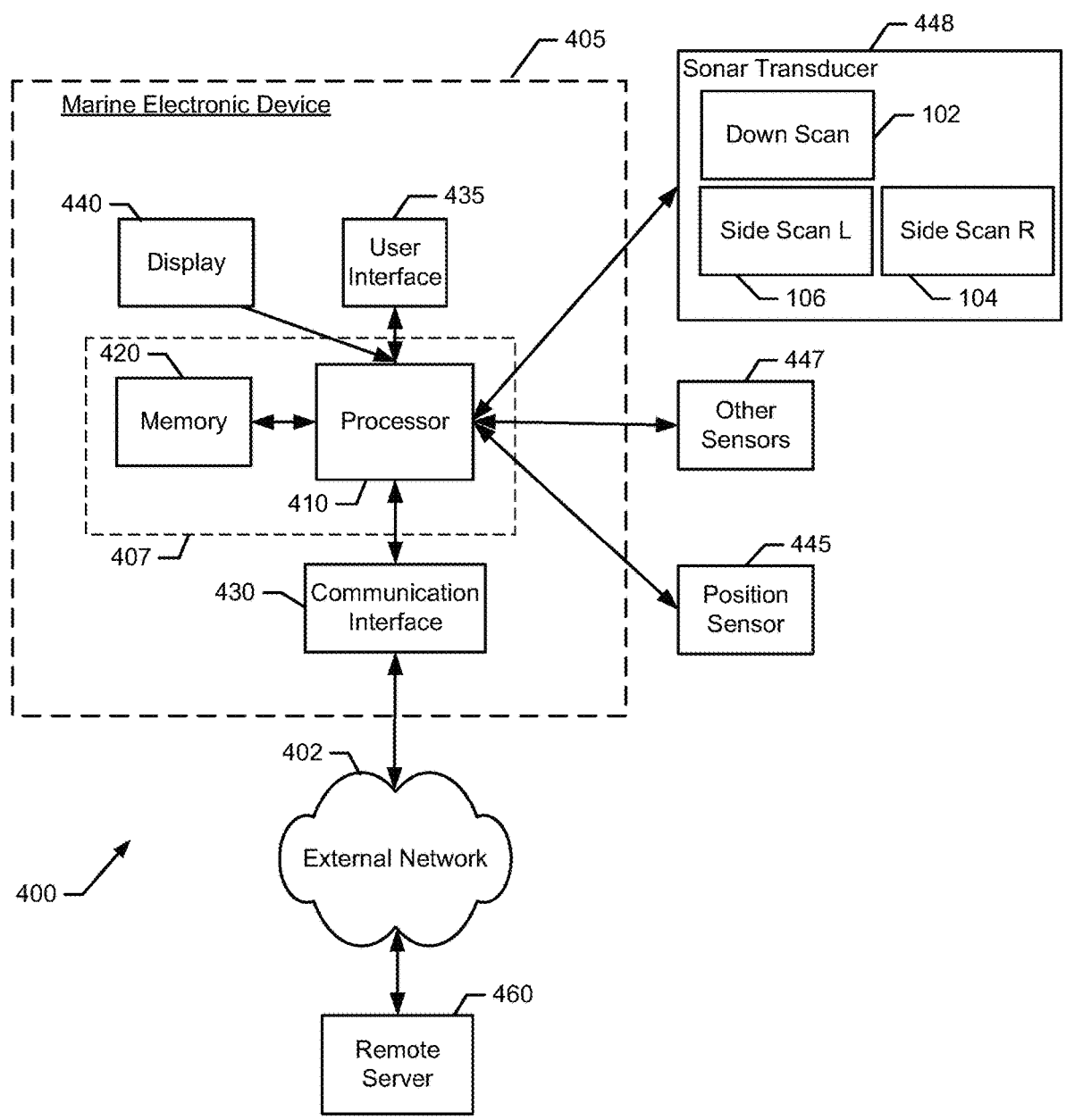
Figure 10:
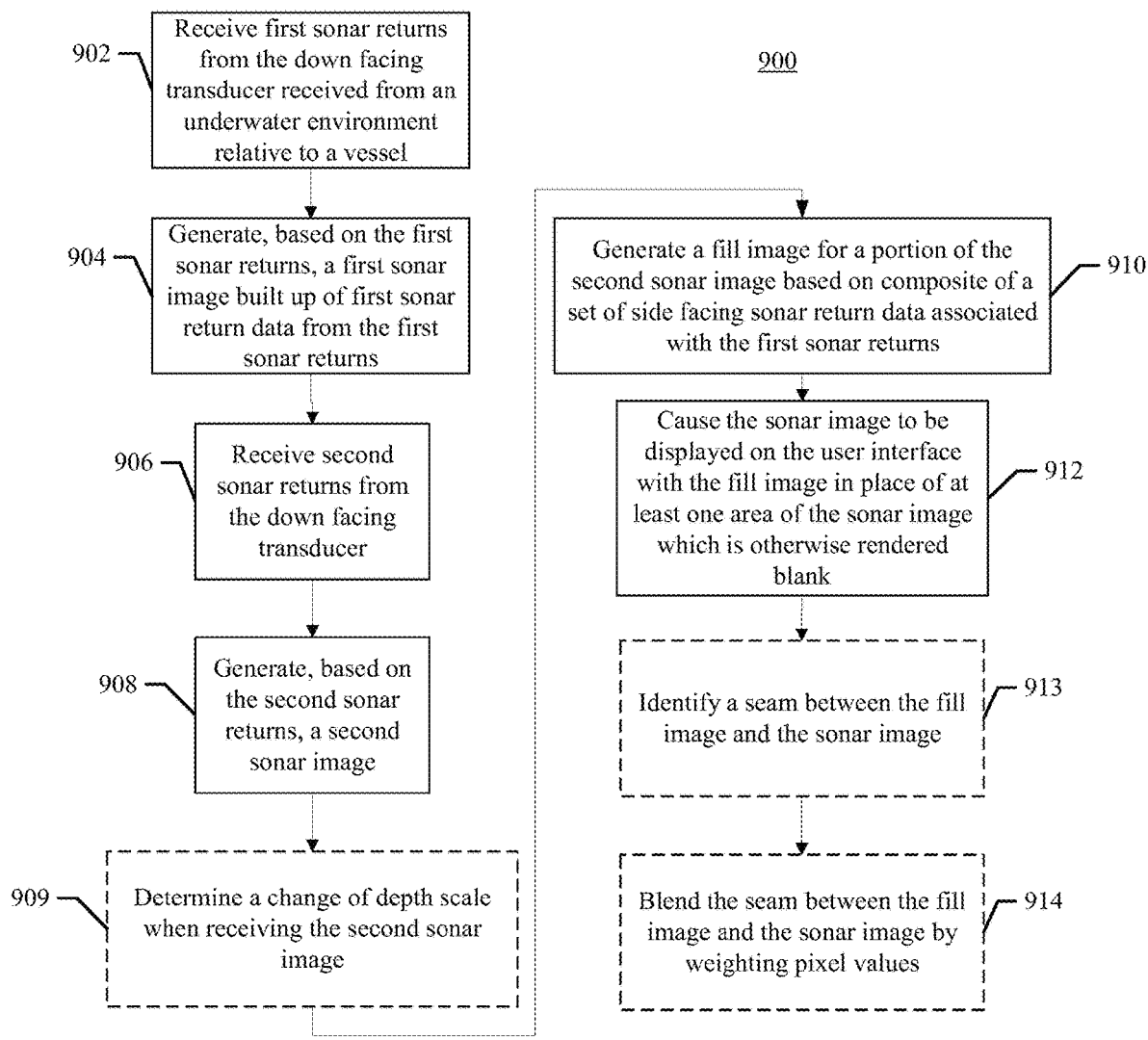
Figure 11:
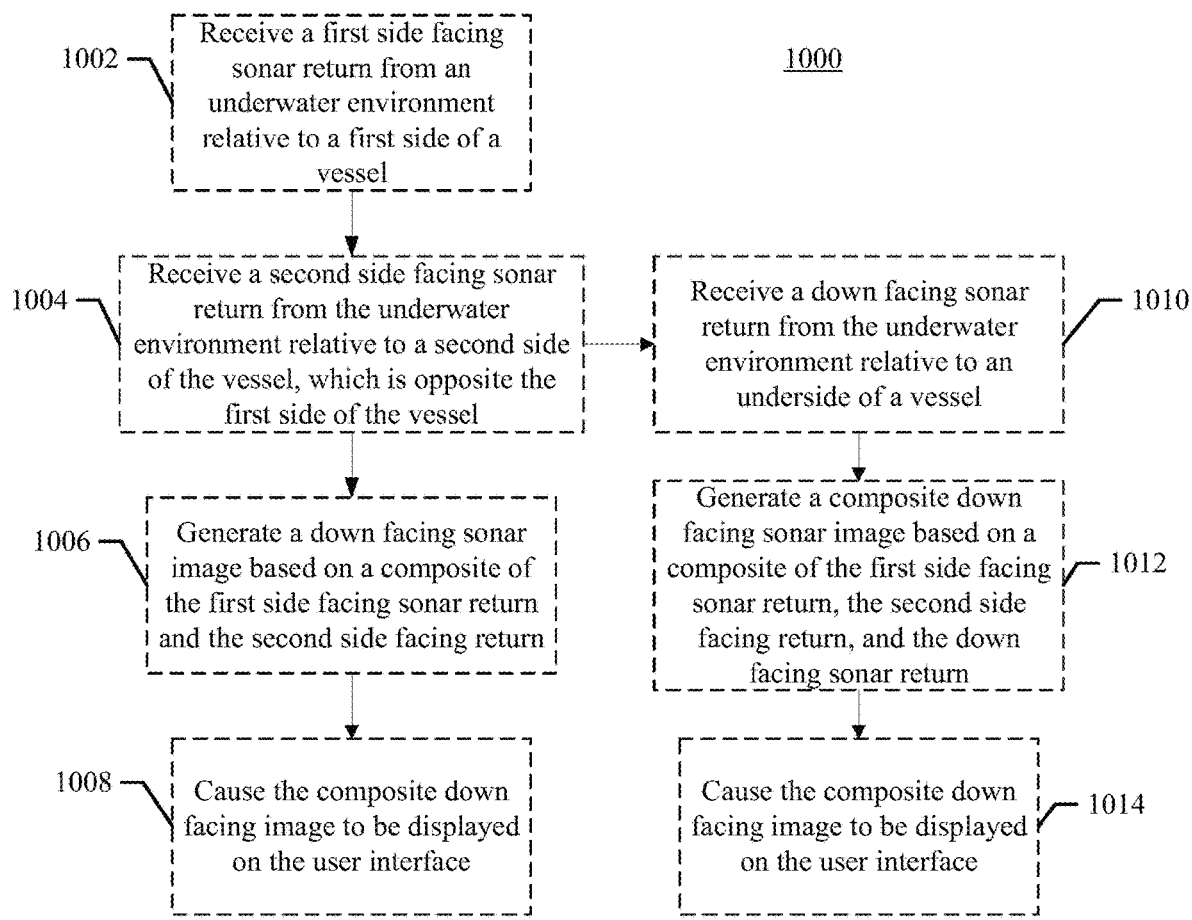

Having thus described the invention in general terms, reference will now be made to the accompanying drawings, which are not necessarily drawn to scale, and wherein:

FIG. 1 illustrates an example vessel including various sonar transducer assemblies, in accordance with some embodiments discussed herein;

FIG. 2 illustrates an example down facing sonar image, in accordance with some embodiments discussed herein;

FIGS. 3A and 3B illustrate example side facing sonar images, in accordance with some embodiments discussed herein;

FIG. 4 illustrates an example composite down facing sonar image based on side facing sonar returns, in accordance with some embodiments, discussed herein;

FIGS. 5-8 illustrate example down facing sonar images including a fill image, in accordance with some embodiments discussed herein;

FIG. 9 illustrates a block diagram of an example marine electronic system, in accordance with some example embodiments discussed herein; and FIGS. 10 and 11 illustrate flowcharts of example methods of controlling presentation of sonar images according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Example Watercraft and Sonar System

As depicted in FIG. 1, a watercraft, e.g. vessel 100, configured to traverse a marine environment, e.g. body of water 101, may use one or more sonar transducer assemblies 102, 104, 106 disposed on and/or proximate to the vessel. The vessel 100 may be a surface watercraft, a submersible watercraft, or any other implementation known to those skilled in the art. The transducer assemblies 102, 104, 106 may each include one or more transducer elements configured to transmit sound waves into a body of water, receive sonar return signals from the body of water, and convert the sonar return signals into sonar return data.

In an example embodiment, the vessel 100 may include a main propulsion motor, such as an outboard or inboard motor, and/or trolling motor configured to propel the vessel 100 or maintain a position. The one or more transducer assemblies (e.g., 102, 104, 106) may be mounted in various positions and to various portions of the vessel 100 and/or equipment associated with the vessel 100. For example, the transducer assemblies may be mounted to the transom of the vessel 100, the bottom or side of the hull of the vessel 100, or may be mounted to the trolling motor.

One or more sonar beams may be generated by the one or more transducer assemblies 102, 104, 106 when deployed in the body of water 101. In some instances, a plurality of transducer elements may be embodied in a transducer assembly. In some instances, the transducer assembly may include one or more of a right facing (e.g., sidescan) element (e.g., to produce sonar beam 112), a left facing (e.g., sidescan) element (e.g., to produce sonar beam 110), a conical down facing sonar element (e.g., to produce sonar beam 108), and/or a bar (e.g., linear, elongated rectangle, or the like) down facing sonar element (e.g., to produce sonar beam 108), which may be housed within a transducer housing.

In the depicted embodiment, the vessel 100 includes three sonar transducers 102, 104, and 106. The sonar transducers include a down facing sonar transducer 102, a left facing sonar transducer 104, and a right facing sonar transducer 106. A first sonar beam 108 is emitted, or projected, from the down facing sonar transducer 102 substantially beneath the vessel 100. A second sonar beam 110 and third sonar beam 112 are emitted or projected from the left facing sonar transducer 104 and right facing sonar transducer 106, respectively. The second sonar beam 110 and the third sonar beam 112 may overlap at least a portion of the first sonar beam 108. As such, it is contemplated that the sonar returns of the second sonar beam 110 and/or the third sonar beam 112 may be utilized to generate at least a portion of a down facing sonar image. For example, the side facing sonar returns may be utilized to generate a "faux" down facing sonar image based on a composite of the side facing sonar returns. Additionally or alternatively, the side facing sonar returns may be used to generate a fill image in a down facing sonar image, such as to fill a portion of the sonar image that does not have associated sonar return data due to a change in depth range.

Example Sonar Images

FIG. 2 illustrates an example down facing sonar image 120. The down facing sonar image 120 may be generated based on a buildup of sonar return data, or sonar slices. Each sonar slice may correspond to a set of sonar returns received at the down facing sonar transducer 102 in response to the emitted sonar beam 108. The sonar image 120 may have a depth range associated with a depth range of the sonar returns. For example, in a left portion 123 of the sonar image (which corresponds to the oldest sonar return data), the displayed sonar imagery is based on a depth range of approximately twenty-five feet. In this regard, in some example embodiments, the depth range associated with the sonar return data may be a function of the bottom depth 122. The sonar return data may include information extending beyond the bottom depth 122 by a predetermined depth. The predetermined depth may be ten feet, fifteen feet, twenty feet, or the like beyond the bottom depth 122. In some example embodiments, the sonar return data may be clipped to a depth range including the bottom depth 122 and the predetermined depth to maximize the useful information displayed in a sonar image 120.

In an example embodiment, the bottom depth 122 of the sonar image 120 may change over time, such as due to travel of the vessel 100. As depicted in FIG. 2, the bottom depth 122 starts at approximately fourteen feet, rises to approximately ten feet, drops to approximately sixteen feet, rises to approximately fourteen feet, and then tappers off to approximately forty-two feet. The depth range of the sonar image 120 changes based on the bottom depth 122, starting at approximate twenty-five feet, increasing to approximately thirty-five feet when the bottom depth exceeds fifteen feet, and decrease when the bottom depth drops to less than fifteen feet, and then increasing to approximately thirty-five feet in response to the bottom depth 122 exceeding fifteen feet, increasing to approximately forty-five feet in response to the bottom depth 122 exceeding thirty feet, and increasing to approximately seventy feet (e.g., a maximum range) in response to the bottom depth 122 exceeding forty feet.

In some embodiments, the depth range of the sonar image 120 may change with the depth range of the sonar return data, such that a portion of the sonar image 120 does not include sonar return data and may be rendered as a blank portion (e.g., blank portion 124). The blank portion 124 of the sonar image 120 corresponds to a time period associated with sonar returns that include a depth range smaller than a maximum depth range of displayed sonar return data. The blank portions may be not be aesthetically pleasing to a user or may give an impression of a malfunction in the sonar system of marine electronic device where no such malfunction exists. As described below, the marine electronic device may utilize side facing sonar return data corresponding to the time period of the blank portion 124 to generate a fill image for the blank portion of the sonar image 120.

FIG. 3A illustrates example side facing sonar images 200A and 200B according to an example embodiment. Typically, the side facing sonar images 200A and 200B are displayed side by side as a continuous image, with the center line corresponding to the location of the vessel 210 being depicted in the middle and the sonar images 200A, 200B extending outward therefrom. As an example, sonar image 200A corresponds to the second sonar transducer 104, e.g. a left side facing sonar image and sonar image 200B corresponds to the third sonar transducer 106, e.g. a right side facing sonar image. Similar to the down facing sonar image 120, the side facing sonar images 200A and 200B are generated based on a buildup of sonar return data, or sonar slices. A vessel position indicator 210 has been added to the sonar images 200A and 200B to indicate that the oldest sonar return data is at the bottom of the sonar images 200A, 200B and the most recent sonar return data is at the top of the sonar images 200A, 200B. FIG. 3B shows sonar images 200A' and 200B'. These are the same sonar images 200A and 200B from FIG. 3A, but having been separated and rotated such that the oldest sonar return data is on the left and the newest sonar return data is on the right, as indicated by the vessel position indicator 210. As oriented in FIG. 3B, the side facing sonar images 200A', 200B' are in similar orientation as the down facing sonar image 120 depicted in FIG. 2.

Turning to FIG. 4, a composite sonar image 310 may be generated based on the first side facing image 200A and/or the second side facing sonar image 200B. The composite sonar image 310 may be depicted in a manner that is substantially similar to a down facing sonar return, e.g. a faux down facing sonar image, of the underwater environment. The marine electronic device may generate the composite sonar image 310 by selecting a pixel value for each pixel in the composite sonar image 310 based on the pixel values of the side facing sonar images 200A, 200B. The marine electronic device may select the pixel values based on any type of criteria, such as a maximum intensity between the two side facing sonar images, the minimum intensity of the two side facing sonar images 200A, 200B, a weight and sum of the intensity of the two side facing sonar images 200A, 200B, etc. In an example embodiment, the weighted intensity value may be the median value between the first and second side facing sonar return data where the weight is 50 percent for each of the first and second side facing sonar return data. The weighted intensity value may be any other suitable weighting value for the first and second side facing sonar value, for example 10 percent/90 percent, 25 percent/75 percent, or the like. In the side facing sonar images 200A, 200B, a higher intensity value is indicated by a brighter, or lighter pixel, indicative of an object at the specified depth in the sonar return. Similarly, a lower pixel intensity value is indicated by a darker pixel, indicative of a weaker or no sonar return of the sonar beam at the specified depth.

Since the composite sonar image 310 includes sonar return data from both the left side facing sonar image 200A and the right side facing sonar image 200B, aspects, or objects, from each may be present. For example, a fish 212 is present in the left side facing sonar image 200A, and a log 214 is present in the right facing sonar image 200B. In the composite sonar image 310, both the fish 212 of the left side facing sonar image and the log 214 of the right side facing sonar image 200B are present, e.g. fish 312 and log 314, respectively. The composite sonar image 310 may be utilized as another presentation method of side facing sonar return data in addition to typical sonar image, or may be utilized in an instance in which a down facing sonar return data or associated sonar image is unavailable, such as due to a malfunction or loss of connection with the down facing sonar transducer 102. Additionally or alternatively, the composite sonar image 310 may be used to verify the presence of one or more objects in the down facing sonar image 120, such as fish 126 depicted in FIG. 2.

In some example embodiments, the composite sonar image 310 may further include the down facing sonar return data, such that the composite sonar image includes the sonar return data associated with at least two of the down facing sonar image 120, the left side facing sonar image 200A, and the right side facing sonar image 200B. The composite sonar image 310 including the down facing sonar return data may be generated in substantially the same manner as the composite sonar image 310 including only the left side sonar return data and right side sonar return data and utilizing the selection of pixel intensity values. This composite sonar image 310, including both down facing sonar return data and the side facing sonar return data, may provide an "all-in-one" sonar image, from which the user may identify one or more objects in the body of water 101. In some examples, the user may then review other sonar images, such as down facing sonar image, the left side sonar image, and/or the right side sonar image to glean further or more specific information.

Turning back to the down facing sonar image 120, the marine electronic device may utilize the composite image, a portion of the composite image, or a similar method to generate a fill image for the blank portion 124 of the down facing sonar image 120. FIGS. 5-8 illustrate down facing sonar images 320 including a fill image 326. The marine electronic device may determine a depth range for one or more down facing sonar returns, e.g. sonar slices, for which the depth range is smaller than the depth range of the current sonar image 320, e.g. the blank portion 124 of the down facing sonar image 120 shown in FIG. 2.

In some example embodiments, the marine electronic device may be configured to generate a fill image designed to fill in the blank portion. For example, the marine electronic device may generate a composite image (e.g., made up of side facing sonar returns) as discussed above with regard to composite sonar image 310 of FIG. 4, and then pull out a portion of that composite image to act as the fill image for the blank portion of the down facing sonar image. In such example embodiments, the marine electronic device may identify the portion of the composite sonar image corresponding to the blank portion 124. The marine electronic device may then generate the fill image and display the fill image over the corresponding blank portion of the down facing sonar return image 120—such as to form a more complete composite sonar image 302 (e.g., shown in FIG. 5).

It should be understood that the above methods to generate the fill image 326 are merely for illustrative purposes and that other suitable methods for generating the fill image 326 would be apparent to one of ordinary skill in the art. Additionally, the fill image 326 may be scaled, as appropriate, to correspond with the scale, e.g. unit area per pixel, of the down facing sonar image 120.

Figure 5:
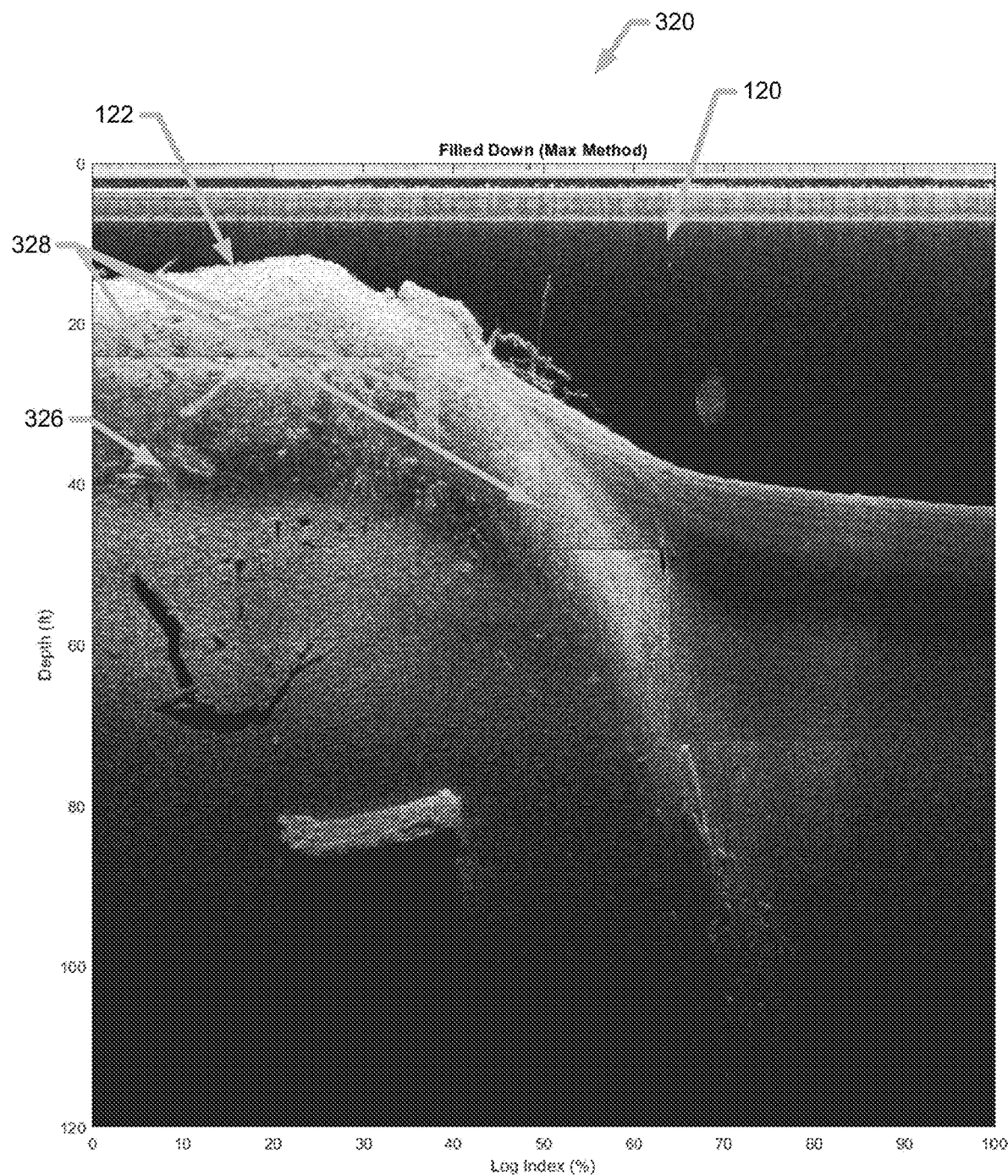
Figure 6:
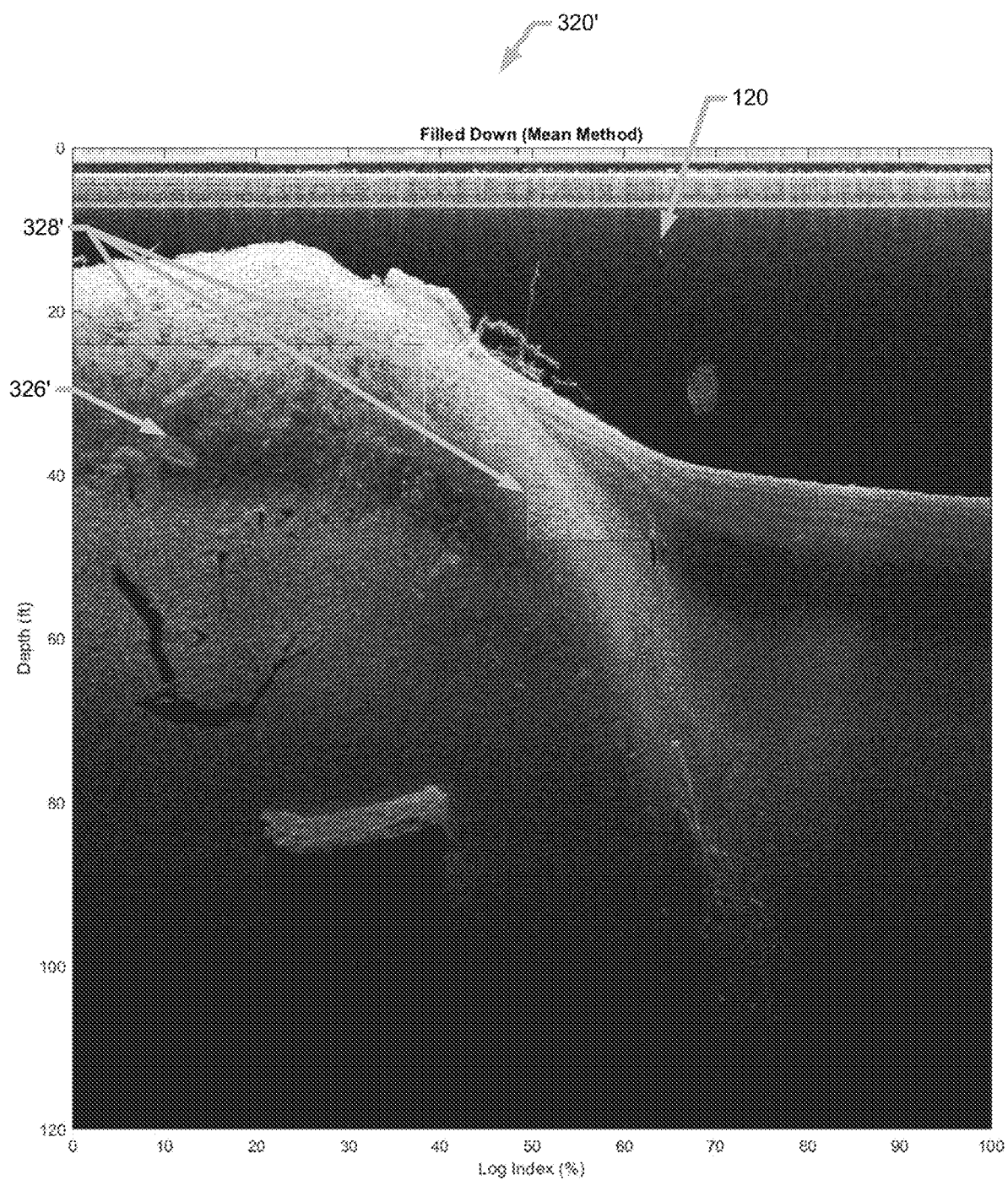
Figure 7:
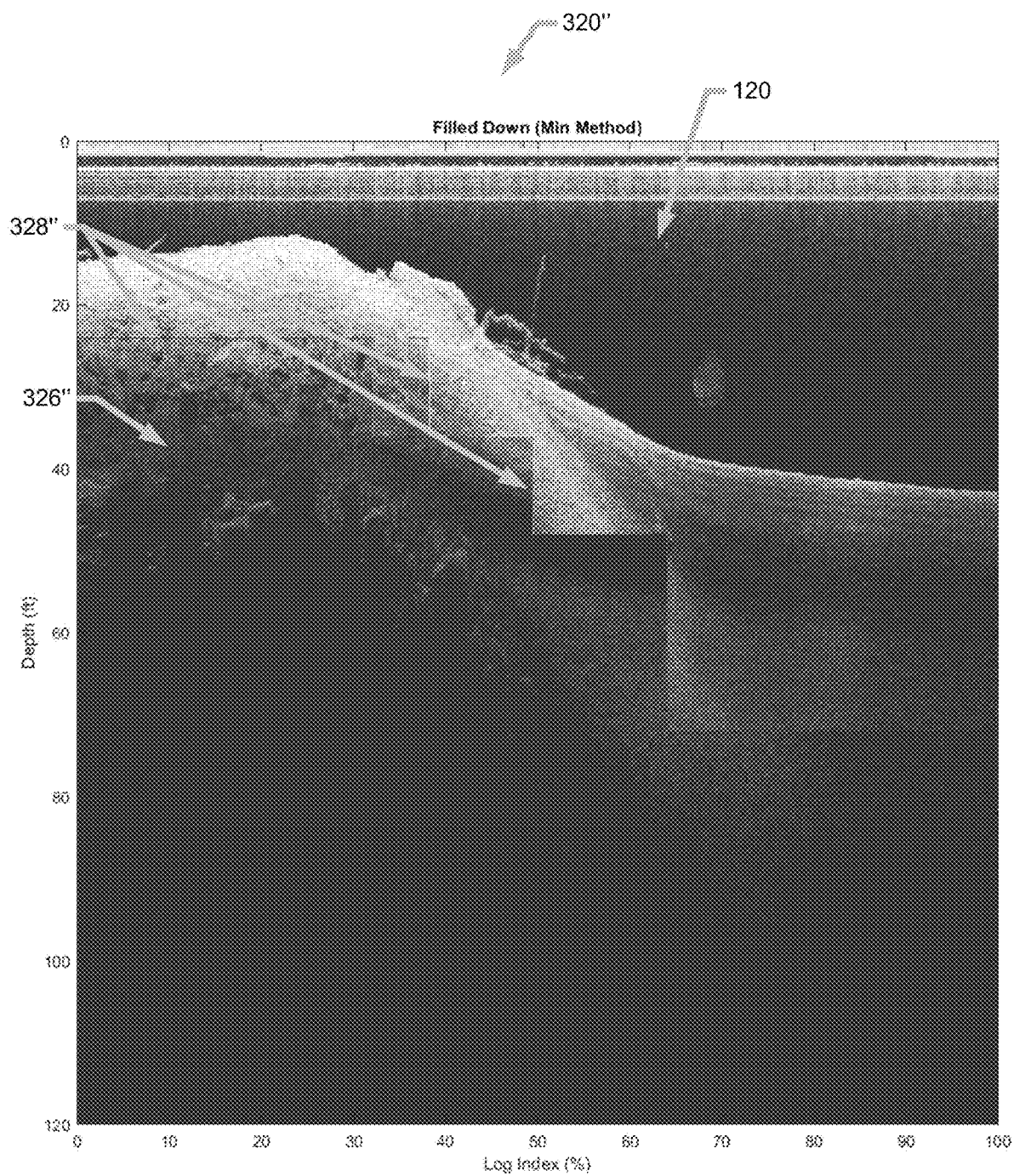

FIGS. 5, 6, and 7 depict fill images 326, 326', 326" generated from both the left facing sonar returns and the right facing sonar returns using the maximum pixel intensity value, the weighted pixel intensity value, and the minimum pixel intensity value of the left side facing sonar return data and the right side facing sonar return data, respectively. Notably, depending on which method is used to form the fill image, some underwater features may or may not be present. For example, in FIG. 7, wherein the fill image 326" is generated using the minimum pixel intensity value, the log 314 is not present in the fill image 326".

Turning back to FIG. 5, due to the different data sources used to generate the down facing sonar image 120 and the fill image 326, seams 328, or edges, may be visible between the down facing sonar image 120 and the fill image 326. The marine electronic device may identify a seam 328 based on the location of the edges of the fill image 326 and corresponding edges of the blank portion 124 of the down facing sonar image 120. In some embodiments, the marine electronic device may be configured to blend the seams 328 between the down facing sonar image 120 and the fill image 326. In some example embodiments, the marine electronic device may be configured to weight and sum the pixel values of one or more pixels within a predetermined number of pixels from the seam 328. For example, the predetermined number of pixels may be five pixels, ten pixels, twenty pixels, or the like from the seam 328. The marine electronic device may weight and sum the pixel intensity values of one or more proximate pixels, or adjacent pixels. In an example embodiment, the marine electronics device is configured to determine a weight of one or more pixels, such as based on proximity to a seam 328, or other suitable criteria. The marine electronics device then sums the weighted pixel values to generate a weighted pixel intensity value for each pixel. The down facing sonar image 120 and fill image 326 may then be rendered on a user interface, with the averaged pixel values blending the seam 328 therebetween.

Figure 8:
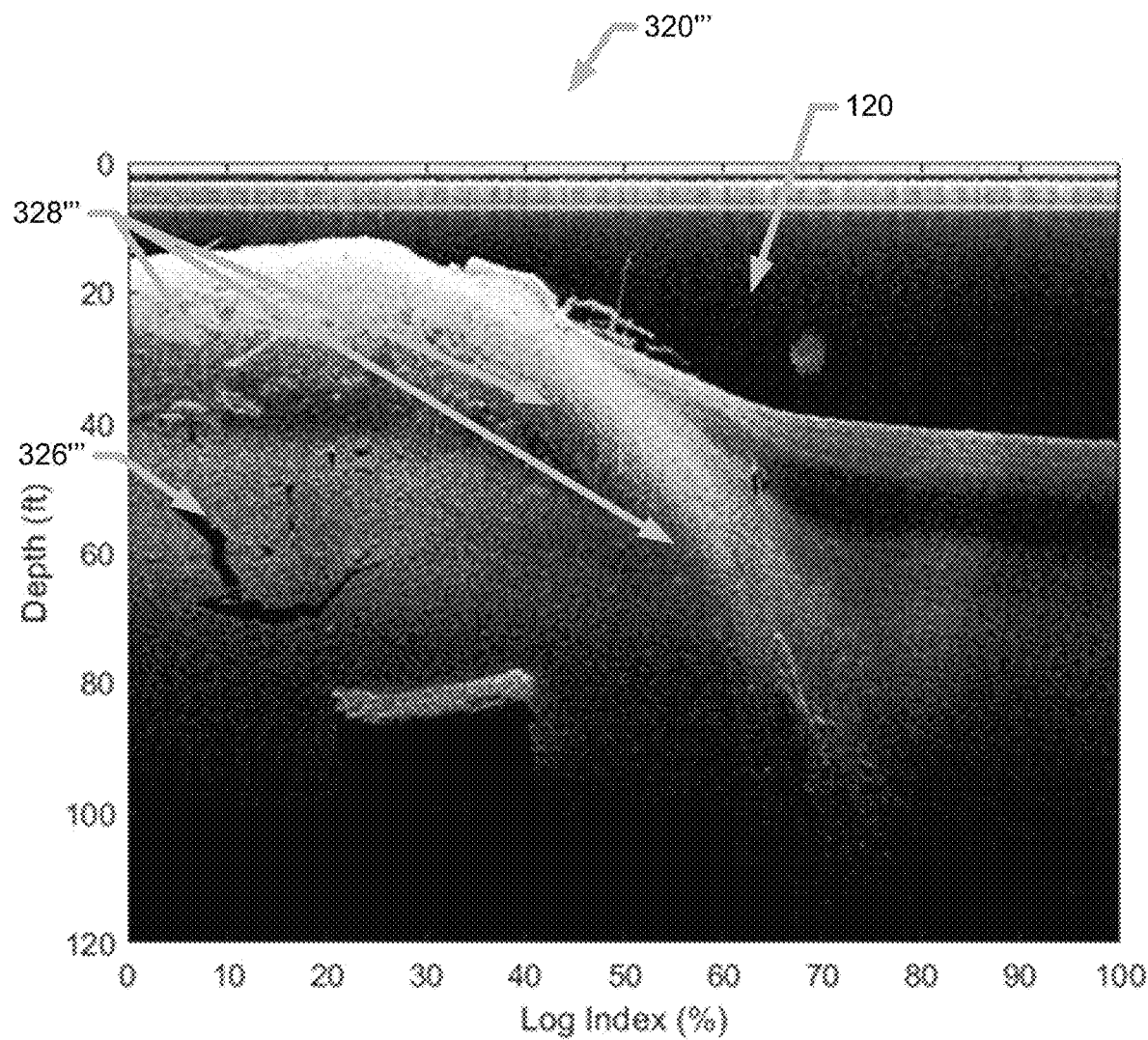

Additionally or alternatively, the marine electronic device may blend the seam 328 by generating a composite image within a predetermined distance from the seam 328. The predetermined distance may be five pixels, ten pixel, twenty pixels, or the like, may be six inches as render, one foot as rendered, or other suitable unit of measure. In an example embodiment, the marine electronic device may identify the seam 328 based on the sonar return data associated with edges of the blank portion 124 of the down facing sonar image 120 or the fill image 326. The marine electronic device may then determine a pixel area of the down facing sonar image 120 within the predetermined distance and a pixel area of at least one of the side facing sonar images 200A, 200B. The marine electronic device may then generate a composite image of the pixel area, as discussed above, to blend the seam 328. FIG. 8 illustrates and example embodiment of the overall sonar image 320''' that includes the down facing sonar image 120 and the fill image 326.

Additionally, however, the seam 328''' has been blended by the marine electronic device, such that the seam 328''' is no longer visible.

In some embodiments, providing a fill image within the down facing sonar image may provide more complete information regarding the underwater environment, or, in at least some cases, a more aesthetically pleasing sonar image. Additionally, providing the fill image within the down facing sonar image may limit or prevent the user from believing that an error or malfunction has occurred, thereby preventing unnecessary repair or troubleshooting.

Example Architecture

FIG. 9 shows a block diagram of an example computing device, such as an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with a network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine data system 400.

The marine electronic device 405 may include a processor 410, a memory 420, a user interface 435, a display 440, and a communication interface 430. Additionally, the marine electronic device 405 may include or otherwise be in communication with one or more sensors (e.g. position sensor 445, other sensors 447, etc.) and/or one or more sonar transducers 448.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device may transmit or receive data, such as sonar signals, sonar returns, sonar image data or the like to or from a sonar transducer 448. In some embodiments, the marine electronic device may also be configured to communicate with a propulsion system of the vessel 100. The marine electronic device may receive data indicative of operation of the propulsion system, such as engine or trolling motor running, running speed, or the like.

The position sensor 445 may be configured to determine the current position and/or location of the marine electronic device 405. For example, the position sensor 445 may comprise a GPS, bottom contour, inertial navigation system, such as microelectromechanical sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 9 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The sonar transducer 448, such as transducer assemblies 102, 104, 106, may be housed in a trolling motor housing, attached to the vessel 100 or, in some cases, be castable or otherwise remote. The sonar transducer 448 (such as in its various parts) may be configured to gather sonar return signals, e.g. sonar returns, from the underwater environment relative to the vessel 100. Accordingly, the processor 410 may be configured to receive the sonar return data from the sonar transducer 448, process the sonar return data to generate an image including a sonar image based on the gathered sonar return data. In some embodiments, the marine electronic device 405 may be used to determine depth and bottom contours, detect fish, locate wreckage, etc. In this regard, sonar beams or pulses from a sonar transducer 448 can be transmitted into the underwater environment. The sonar signals reflect off objects in the underwater environment (e.g. fish, structure, sea floor bottom, etc.) and return to the transducer assembly, which converts the sonar returns into sonar return data that can be used to produce a sonar image of the underwater environment.

The sonar transducer 448 may include one or more transducer assemblies, transducer arrays, or individual transducer elements that may transmit one or more sonar signals, e.g. sonar beams, into a body of water with a transmit transducer, a transmit/receive transducer, or similar device. When the sound waves, of the sonar beams, strike anything of differing acoustic impedance (e.g., the sea floor or something suspended in the water above the bottom), the sound waves reflect off that object. These echoes (or sonar return signals) may strike the transmitting transducer element and/or separate one or more sonar receiver elements, which convert the echoes back into an electrical signal which is processed by a processor (e.g., processing circuitry 407) and sent to a display (e.g., an LCD) mounted in the cabin or other convenient location in the watercraft. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to produce a sonar image representing the underwater environment.

In some example embodiments, the sonar transducer 448 (or a portion thereof) may be a transducer array, e.g. a "phased array." The transducer array may include a plurality of transducer elements arranged on a printed circuit board (PCB). The PCB may mechanically support and electrically connect the electronic components, including the transducer elements using conductive tracks (e.g. traces), pads, and other features. The conductive tracks may comprise sets of traces, for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals.

In some example embodiments, the sonar transducer 448 may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a two-dimensional and/or a three-dimensional position of the sonar return signals (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging", published as US 2016/0341827, and U.S. Pat. No. 9,739,884, entitled Systems and Associated Methods for Producing a 3D Sonar Image," both of which are assigned to the Assignee of the present application and are hereby incorporated by reference herein in their entireties.

Example Flowchart(s) and Operations

Embodiments of the present invention provide methods, apparatus and computer program products for controlling presentation of sonar images. Various examples of the operations performed in accordance with embodiments of the present invention will now be provided with reference to FIGS. 10 and 11.

FIGS. 10 and 11 illustrate flowcharts according to example methods for controlling presentation of sonar images according to an example embodiment. The operations illustrated in and described with respect to FIGS. 10 and 11 may, for example, be performed by, with the assistance of, and/or under the control of one or more of the processor 410, memory 420, communication interface 430, user interface 435, position sensor 445, other sensor 447, display 440, and/or sonar transducers 448.

A method 900 may include receiving first sonar returns from the down facing transducer received from an underwater environment relative to a vessel at operation 902, generating, based on the first sonar returns, a first sonar image built up of first sonar return data from the first sonar returns at operation 904, receiving second sonar returns from the down facing transducer at operation 906, generating, based on the second sonar returns, a second sonar image at operation 908, generating a fill image for a portion of the second sonar image based on composite of a set of side facing sonar return data associated with the first sonar returns at operation 910, and causing the sonar image to be displayed on the user interface with the fill image in place of at least one area of the sonar image which is otherwise rendered blank at operation 912.

In some embodiments, the method 900 may include additional, optional operations, and/or the operations described above may be modified or augmented. Some examples of modifications, optional operations, and augmentations are described below, as indicated by dashed lines, such as, determining a change of depth scale when receiving the second sonar image at operation 909, identifying a seam between the fill image and the sonar image, and blending the seam between the fill image and the sonar image, such as by weighting pixel values at operation 914.

A method 1000 may include receiving a first side facing sonar return from an underwater environment relative to a first side of a vessel at operation 1002, receiving a second side facing sonar return from the underwater environment relative to a second side of the vessel, which is opposite the first side of the vessel, at operation 1004, generating a down facing sonar image based on a composite of the first side facing sonar return and the second side facing return at operation 1006, and causing the composite down facing image to be displayed on the user interface at operation 1008. The method 1000 may also include receiving a down facing sonar return from the underwater environment relative to an underside of a vessel at operation 1010, generating a composite down facing sonar image based on a composite of the first side facing sonar return, the second side facing return, and the down facing sonar return at operation 1012, and causing the composite down facing image to be displayed on the user interface at operation 1014.

FIGS. 10 and 11 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. An apparatus for providing marine information, the apparatus comprising:
    a user interface;
    a processor; and
    a memory including computer program code, the memory and the computer program code configured to, with the processor, cause the apparatus to:
    receive first side facing sonar returns from at least one first side facing transducer received from an underwater environment relative to a first side of a vessel;
    receive second side facing sonar returns from at least one second side facing transducer received from the underwater environment relative to a second side of the vessel, wherein the second side of the vessel is opposite the first side of the vessel;
    generate a composite down facing sonar image formed based on historical one-dimensional sonar data taken over time from both of the first side facing sonar returns and the second side facing returns, wherein the down facing sonar image is formed of at least:
    a first sonar image slice that is generated based on a composite of the first side facing sonar returns and the second side facing sonar returns taken at a first time; and
    a second sonar image slice that is generated based on a composite of the first side facing sonar returns and the second side facing sonar returns taken at a second time, where the second time is different than the first time, wherein the down facing sonar image is built up of at least the first sonar image slice extending downwardly adjacent to the second sonar image slice; and
    cause the composite down facing sonar image to be displayed on the user interface.

2. The apparatus of claim 1, wherein generating the composite down facing sonar image comprises generating the composite down facing sonar image based on maximum intensity value sonar returns from among the first side facing sonar returns and the second side facing sonar returns, wherein a first sonar return from the first side facing sonar returns is selected for use in generating the composite down facing sonar image over a second sonar return from the second side facing sonar returns when the first sonar return would have a same position as the second sonar return within the composite down facing sonar image and has a greater intensity value than the second sonar return.

3. The apparatus of claim 1, wherein generating the composite down facing sonar image comprises generating the composite down facing sonar image based on minimum intensity value sonar returns from among the first side facing sonar returns and the second side facing sonar returns, wherein a first sonar return from the first side facing sonar returns is selected for use in generating the composite down facing sonar image over a second sonar return from the second side facing sonar returns when the first sonar return would have a same position as the second sonar return within the composite down facing sonar image and has a lesser intensity value than the second sonar return.

4. The apparatus of claim 1, wherein generating the composite down facing sonar image comprises generating the first sonar image slice based on a composite of weighted intensity values of the first side facing sonar returns and the second side facing sonar returns.

5. The apparatus of claim 1, wherein the memory and the computer program code are further configured to, with the processor, cause the apparatus to:
receive down facing sonar returns from an underwater environment relative to a bottom of a vessel.

6. The apparatus of claim 5, wherein the memory and the computer program code are further configured to, with the processor, cause the apparatus to:
generate a down sonar image based on the down facing sonar returns; and
cause the down sonar image to be displayed on the user interface,
wherein the composite down facing sonar image is displayed on the user interface in response to the down sonar image being unavailable.

7. The apparatus of claim 5, wherein the composite down facing sonar image is further based on the down facing sonar returns.

8. A method of providing marine information, the method comprising:
receiving first side facing sonar returns from at least one first side facing transducer received from an underwater environment relative to a first side of a vessel;
receiving second side facing sonar returns from at least one second side facing transducer received from the underwater environment relative to a second side of the vessel, wherein the second side of the vessel is opposite the first side of the vessel;
generating a composite down facing sonar image formed based on historical one-dimensional sonar data taken over time from both of the first side facing sonar returns and the second side facing returns, wherein the down facing sonar image is formed of at least:
a first sonar image slice that is generated based on a composite of the first side facing sonar returns and the second side facing sonar returns taken at a first time; and
a second sonar image slice that is generated based on a composite of the first side facing sonar returns and the second side facing sonar returns taken at a second time, where the second time is different than the first time, wherein the down facing sonar image is built up of at least the first sonar image slice extending downwardly adjacent to the second sonar image slice; and
causing the composite down facing sonar image to be displayed on the user interface.

9. The method of claim 8, wherein generating the composite down facing sonar image comprises generating the composite down facing sonar image based on maximum intensity value sonar returns from among the first side facing sonar returns and the second side facing sonar returns, wherein a first sonar return from the first side facing sonar returns is selected for use in generating the composite down facing sonar image over a second sonar return from the second side facing sonar returns when the first sonar return would have a same position as the second sonar return within the composite down facing sonar image and has a greater intensity value than the second sonar return.

10. The method of claim 8, wherein generating the composite down facing sonar image comprises generating the composite down facing sonar image based on minimum intensity value sonar returns from among the first side facing sonar returns and the second side facing sonar returns, wherein a first sonar return from the first side facing sonar returns is selected for use in generating the composite down facing sonar image over a second sonar return from the second side facing sonar returns when the first sonar return would have a same position as the second sonar return within the composite down facing sonar image and has a lesser intensity value than the second sonar return.

11. The method of claim 8, wherein generating the composite down facing sonar image comprises generating the first sonar image slice based on a composite of weighted intensity values of the first side facing sonar returns and the second side facing sonar returns.

12. The method of claim 8 further comprising:
receiving down facing sonar returns from an underwater environment relative to a bottom of a vessel.

13. The method of claim 12 further comprising:
generating a down sonar image based on the down facing sonar returns; and
causing the down sonar image to be displayed on the user interface,
wherein the composite down facing sonar image is displayed on the user interface in response to the down sonar image being unavailable.

14. The method of claim 12, wherein the composite down facing sonar image is further based on the down facing sonar returns.

15. A system for providing marine information, the system comprising:
a plurality of sonar transducers, wherein each of the plurality of sonar transducers is configured to transmit one or more sonar beams into an underwater environment, wherein the plurality of sonar transducers comprises a first side facing transducer and a second side facing transducer; and
a marine electronic device comprising:
a user interface;
a processor;
a memory including computer program code, the memory and the computer program code configured to, with the processor, cause the apparatus to:
receive, from the first side facing transducer, first side facing sonar returns from the underwater environment relative to a first side of a vessel;
receive, from the second side facing transducer, second side facing sonar returns from the underwater environment relative to a second side of the vessel, which is opposite the first side of the vessel;

generate a composite down facing sonar image formed based on historical one-dimensional sonar data taken over time from both a composite of the first side facing sonar returns and the second side facing returns, wherein the down facing sonar image is formed of at least:
- a first sonar image slice that is generated based on a composite of the first side facing sonar returns and the second side facing sonar returns taken at a first time; and
- a second sonar image slice that is generated based on a composite of the first side facing sonar returns and the second side facing sonar returns taken at a second time, where the second time is different than the first time, wherein the down facing sonar image is built up of at least the first sonar image slice extending downwardly adjacent to the second sonar image slice;
- cause the composite down facing sonar image to be displayed on the user interface.

16. The system of claim 15, wherein generating the composite down facing sonar image comprises generating the composite down facing sonar image based on maximum intensity value sonar returns from among the first side facing sonar returns and the second side facing sonar returns, wherein a first sonar return from the first side facing sonar returns is selected for use in generating the composite down facing sonar image over a second sonar return from the second side facing sonar returns when the first sonar return would have a same position as the second sonar return within the composite down facing sonar image and has a greater intensity value than the second sonar return.

17. The system of claim 15, wherein generating the composite down facing sonar image comprises generating the composite down facing sonar image based on minimum intensity value sonar returns from among the first side facing sonar returns and the second side facing sonar returns, wherein a first sonar return from the first side facing sonar returns is selected for use in generating the composite down facing sonar image over a second sonar return from the second side facing sonar returns when the first sonar return would have a same position as the second sonar return within the composite down facing sonar image and has a lesser intensity value than the second sonar return.

18. The system of claim 15, wherein generating the composite down facing sonar image comprises generating the first sonar image slice based on a composite of weighted intensity values of the first side facing sonar returns and the second side facing sonar returns.

19. The system of claim 15, wherein the memory and the computer program code are further configured to, with the processor, cause the apparatus to:
- receive, from a down facing transducer, down facing sonar returns from the underwater environment relative to a bottom of a vessel;
- generate a down sonar image based on the down facing sonar returns; and
- cause the down sonar image to be displayed on the user interface,
- wherein the composite down facing sonar image is displayed on the user interface in response to the down sonar image being unavailable.

20. The system of claim 15, wherein the memory and the computer program code are further configured to, with the processor, cause the apparatus to:
- receive, from a down facing transducer, down facing sonar returns from the underwater environment relative to a bottom of a vessel, wherein the composite down facing sonar image is further based on the down facing sonar returns.

* * * * *